Aug. 18, 1953 — E. C. CHAPMAN ET AL — 2,649,527
BUTT WELDING TUBE ENDS BY INDUCTION HEATING
Filed Jan. 18, 1951 — 2 Sheets-Sheet 1

INVENTORS
E. Corbin Chapman
Roy E. Lorentz, Jr.
BY C. F. Bryant
ATTORNEY

Aug. 18, 1953 — E. C. CHAPMAN ET AL — 2,649,527
BUTT WELDING TUBE ENDS BY INDUCTION HEATING
Filed Jan. 18, 1951 — 2 Sheets-Sheet 2

INVENTORS
E. Corbin Chapman
Roy E. Lorentz, Jr.
BY
C. F. Bryant
ATTORNEY

Patented Aug. 18, 1953

2,649,527

UNITED STATES PATENT OFFICE 2,649,527

BUTT WELDING TUBE ENDS BY INDUCTION HEATING

Edward Corbin Chapman and Roy E. Lorentz, Jr., Chattanooga, Tenn., assignors to Combustion Engineering, Inc., a corporation of Delaware Application January 18, 1951, Serial No. 206,554

7 Claims. (Cl. 219—4)

This invention relates to welding metal bodies by the aid of electrical energy inductively transmitted thereto, and it has special reference to butt welding the ends of metal tubes through employment of high frequency electrical induction to heat the tube end metal to welding temperature.

Broadly stated, the object of this invention is to provide improved apparatus and technique for butt welding tube ends by induction heating in the general manner disclosed by co-pending application Serial No. 41,445, filed July 30, 1948 in name of E. C. Chapman under title of "Apparatus for Welding" and issued as U. S. Patent No. 2,542,393, dated February 20, 1951.

A more specific object is to keep the band of inductive heating applied to the tube ends sufficiently narrow so that objectionable flaring of the tube metal will not occur when those ends are pressed together after the temperature thereof has been raised to welding value.

Another object is to provide an improved induction heating conductor for concentrically encircling the extreme edge portions of the tube ends that are to be welded in the manner aforesaid.

A further object is to narrow the axial confines of the high frequency alternating magnetic flux which the encircling conductor passes through said edge portions for the purpose of inductively heating them to welding temperature.

A still further object is to provide laminated flux concentrators capable of being positioned on either side of the encircling conductor at the start of the welding cycle when narrowing of the tube end heating band is imperative, and of being removed from the encircling conductor later in the cycle when such narrowing is no longer necessary.

An additional object is to provide improved means for bathing the tube end metal in a non-oxidizing gas which prevents air contamination of that metal at the high temperatures encountered during welding.

Other objects and advantages of the invention will become apparent as the disclosure and description hereof proceeds. Illustrative embodiments of the improved tube welding technique and of apparatus suitable for practicing same are shown by the accompanying drawings wherein.

Figures 1, 2, 3:
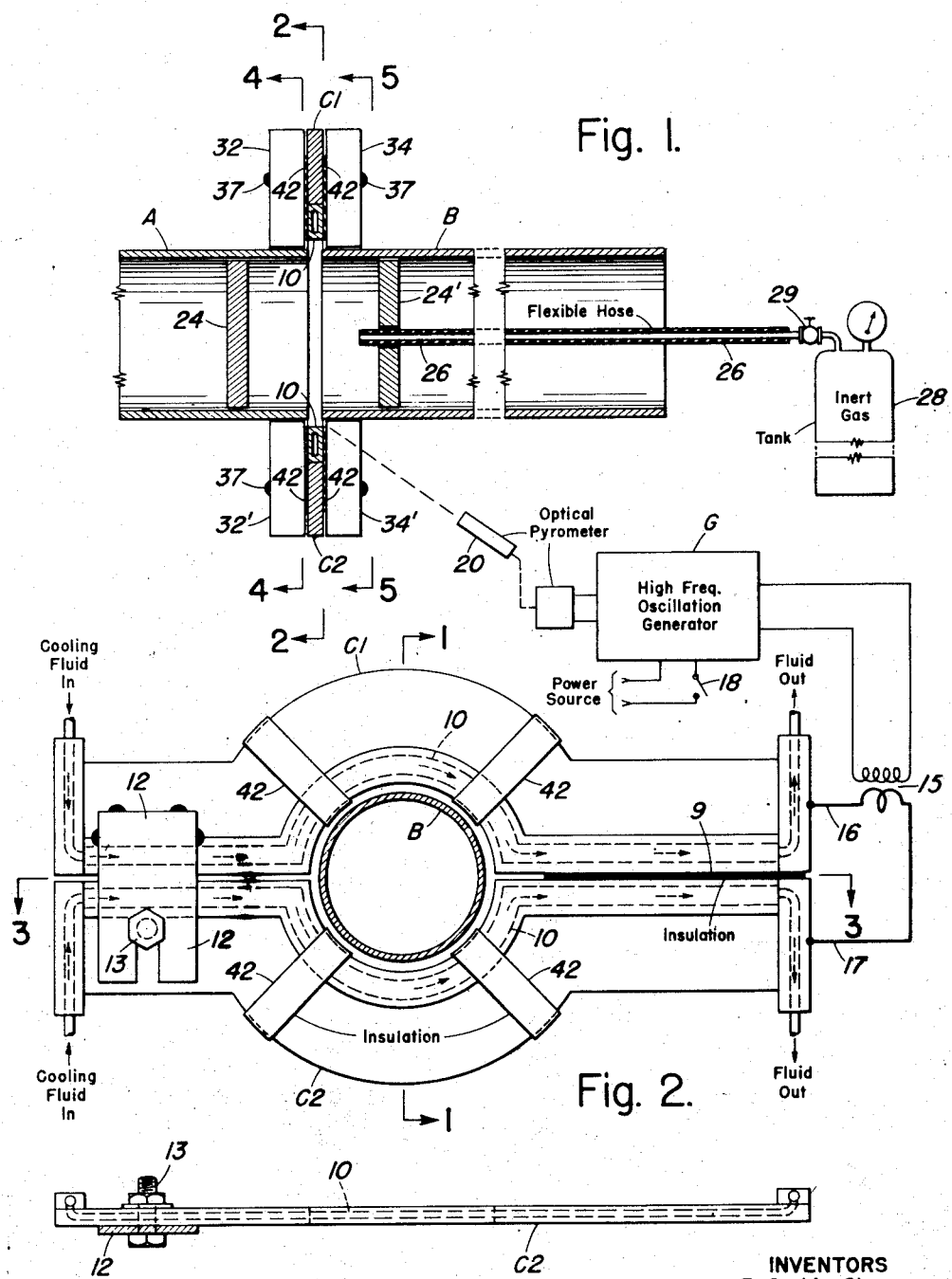
Fig. 1 is a cross-section, taken on line 1—1 of Figs. 2, 4 and 5, showing the approximate position of the improved induction coil and cooperating flux concentrators with respect to the two tube ends to be welded and also showing means for providing an atmosphere of non-oxidizing gas adjacent the tube ends during their heating preparatory to welding.
Fig. 2 is a sectional elevation on line 2—2 of Fig. 1 showing the double-split construction of the improved inductor of Fig. 1 and also diagramming typical circuits for supplying high frequency current to the inductor.
Fig. 3 is a section on line 3—3 of Fig. 2 further showing how the narrow fluid-cooled inductor coil is constructed.
Figure 4:
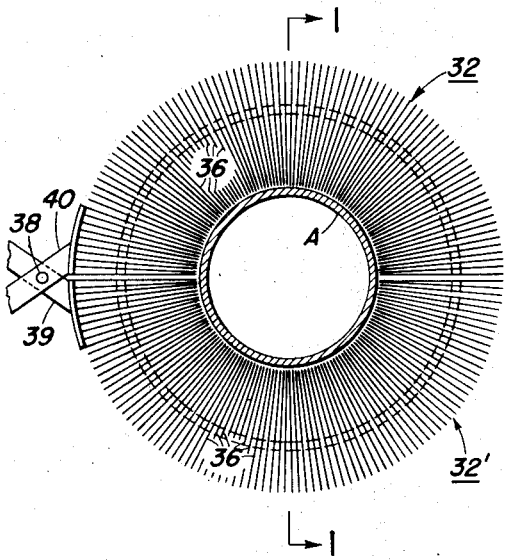
Fig. 4 is an elevation on line 4—4 of Fig. 1 showing one of the two flux concentrator assemblages as viewed from its inner side.
Figure 5:
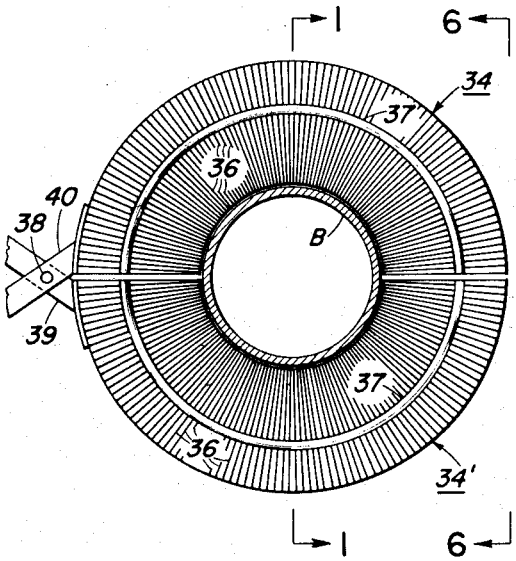
Fig. 5 is an elevation on line 5—5 of Fig. 1 showing the other or companion flux concentrator as viewed from its outer side.
Figure 7:
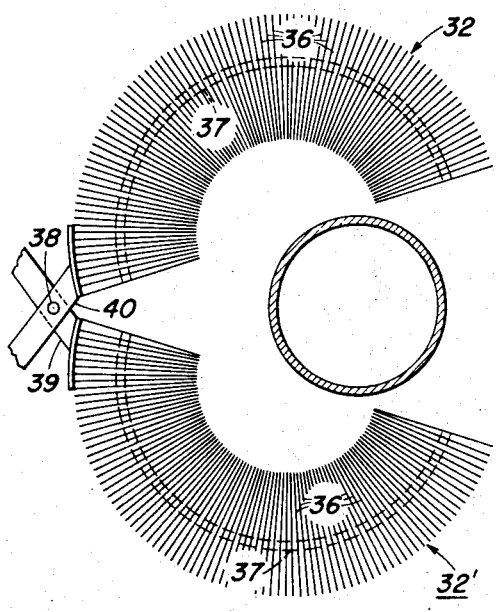
Figure 8:
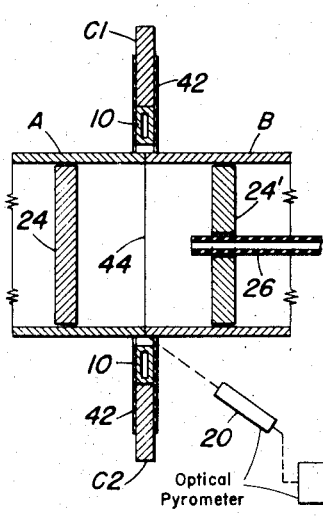
Figure 6:
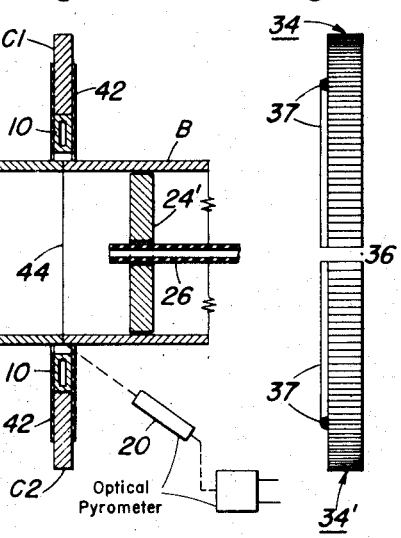
Fig. 6 is a view in end elevation from line 6—6 of Fig. 5 showing further details of the flux concentrator construction.

Fig. 7 indicates how the concentrator assemblage of Fig. 4 or Fig. 5 may be opened about its hinge for removal from around the metal tube which it encircles as in the earlier views; and Fig. 8 is a cross-sectional view corresponding to Fig. 1 but differing therefrom by showing the two tube ends abutted together in welded position and by showing the heating inductor coil with the flux concentrators removed from the two sides thereof.

The welding facilities here disclosed

In the drawing views thereof, the tube ends to be welded are shown at A and B; these two tube ends being mounted in alignment in any suitable apparatus (not shown) well known in the art. Such apparatus conventionally includes separate clamping blocks (also not shown) for the two tubes A and B, one of which blocks may be stationary and the other movable in a direction axial with the tubes or both blocks may be movable in said direction. In this manner, the tubes may be moved axially with respect to one another in a way permitting them to be initially separated as shown in Fig. 1 and thereafter to be brought into physical contact for welding as shown in Fig. 8.

To clarify explanation, it will be assumed that these tubes A and B to be welded are of the type used in steam generating boilers and the like; such tubes being formed of ferrous metal and having an inside diameter typified by three inches and a wall thickness typified by one quarter inch. As the description hereof proceeds it will become apparent that the technique and apparatus here disclosed may also be used to weld the ends of tubes formed of metal other than iron or steel and having inside diameters either greater or less than three inches and wall thicknesses either greater or less than 0.25 inch; experience showing that tubes of larger diameters and of greater wall thickness present relatively less difficulty in this butt welding than do tubes of smaller diameter (as two inches or below) with thinner walls (as 0.15 inch and below).

*New inductor heating coil encircles tube ends*

Electrical energy for heating the end metal of aligned tubes A and B is transmitted thereto from an induction coil C mounted concentrically to surround those abutting tube ends in the manner shown. This coil has the comparatively narrow width indicated by Figs. 1, 3 and 8; one-quarter inch being the thickness of coil section in the construction here represented. The coil may satisfactorily be made of copper and preferably it comprises the two halves designated C1 and C2 in Figs. 1, 2 and 8. These two halves are joined together as shown at the left of Fig. 2 to form the single continuous turn which Fig. 2 represents; the unjoined coil ends (right of Fig. 2) being separated one from another by suitable insulation 9 interposed therebetween.

To prevent this single-turn coil C from overheating, each of the two halves thereof is provided with an inner hollow section 10 through which a cooling fluid may be passed in the manner designated by the small arrows of Fig. 2. Each of these cooling sections 10 is integrally attached to its associated conductor body C1 and C2 in any suitable manner such as by the aid of silver solder placed along the junction line between section 10 and the conductor body C. Water at room temperature or below may satisfactory be used as the cooling fluid mentioned above.

Preferably the inner portion of this induction coil C is made of somewhat larger diameter than the tube ends A and B immediately surrounded so as to provide between the coil and the tube metal a clearance of the general order illustrated in Figs. 1, 2 and 8; a gap of the order of one quarter inch proving satisfactory in practice.

The represented construction of the induction coil in the upper and lower halves C1 and C2 offers practical advantages from the standpoint of ease of assembly and interchange of coil sizes to accommodate differing diameters of the metal tubes A and B which are to be welded together at their abutting ends; and attachment of the two half ends (left of Fig. 2) may be accomplished in any suitable manner which insures proper electrical interconnection of the halves accompanied by adequate mechanical rigidity.

In the arrangement illustrated, use is made of a bar 12 welded or otherwise secured to the upper coil half C1 as shown in Fig. 2 and detachably bolted to the lower coil half C2 as shown at 13 in Figs. 2 and 3. Such arrangement enables the front of the coil C (left in Fig. 2) readily to be opened to permit removal of the tubes A and B after the ends thereof have been welded together as shown in Fig. 8; it also allows the two coil halves easily to be clamped back together preparatory to welding the ends of another set of tubes A and B.

The other or unjoined ends of coil halves C1 and C2 (shown at the right of Fig. 2) are connected with a source of heating current diagrammed in Fig. 2 as including a transformer 15 whose low voltage and high amperage secondary winding is directly joined with said coil ends via flexible conductors 16 and 17. These flexible connections permit the aforementioned opening of the front coil ends when it is desired to remove the weld pipe lengths A and B (Fig. 8) from the apparatus.

The primary winding of transformer 15 is energized from a high frequency oscillation generator generally designated at G in Fig. 2. Since such generators are well known, no attempt to illustrate details is here made; instead it will suffice to say that upon closure of a switch 18 generator G supplies transformer 15 with alternating electrical current of a relatively high frequency typified by several thousand cycles per second (three thousand may be taken as illustrative). The intensity of this heating current as transmitted by transformer 15 to inductor coil C is adjusted so as to produce the requisite heating of tube ends A and B as will later be explained; this adjustment being accomplished at generator G in well known manner.

Automatic control of said heating current adjustment may if desired be provided through the use of an optical pyrometer having a viewer 20 trained on the weld line between tubes A and B in the general manner shown by Figs. 1 and 8. This pyrometer is so coordinated with generator G that when set for a predetermined temperature corresponding to a bright red color of the welded metal, it will automatically adjust the inductive heating current so as to hold that temperature substantially constant.

*Non-oxidizing gas bathes the tube ends during initial heating*

In preparing the tubes A and B for welding there is placed in the end of each a plug-like baffle shown at 24 in Figs. 1 and 8. These baffles may satisfactorily be of fibre or other suitable material and their purpose is to provide a compartment frim which the aligned but separated edges of tubes A and B (Fig. 1) define an annular or ring-like outlet. One of these tube plugs 24' has an opening therethrough adapted (as by the aid of a nipple not shown) to accommodate the end of a flexible hose 26 that extends from plug 24' through the entire length of tube B for connection with a tank 28 or other source of non-oxidizing gas such as hydrogen; this source 28 of non-oxidizing or inert gas being located beyond the remote end of tube B as Fig. 1 indicates.

An opening of tank valve 29 admits non-oxidizing gas through hose 26 into the space between tube baffles 24' and 24. With the ends of tubes A and B initially separated as in Fig. 1, such admitted gas flows out past the tube end metal radially through the gap which separates the tube ends. This out-flowing gas bathes the tube end metal in a way preventing air contamination thereof at the high temperatures encountered during welding.

Once the tube ends A and B have been brought together and welded as shown in Fig. 8, the need for non-oxidizing gas supply no longer continues and valve 29 may then be closed.

In preparing the aforesaid tube B (at right in Figs. 1 and 8) for welding, the flexible hose 26 (which may be formed of rubber) is inserted from the remote or right end of tube B (see Fig. 1) until the forward end of the hose can be reached from the left end of tube B engaged by the welding apparatus. The hose end is then passed through the opening in plug 24' and that plug then pushed slightly back from the left end of tube B as shown in Figs. 1 and 8. Preparation of the accompanying tube A (shown at left in Figs. 1 and 8) is even simpler in that it merely requires insertion of the solid plug 24 into the tube end interior as indicated.

*Laminated flux concentrators flank the sides of inductor coil C*

One of the past difficulties has been to keep the band of heating flux sufficiently narrow so that objectionable flaring of tube metal will not occur when the heated tube ends are pressed together after the temperature thereof has been raised to welding value. In accordance with this invention the desired narrowing of the flux band is achieved by providing laminated flux concentrators 32 and 34 capable of being positioned on either side of the encircling heating conductor C in the general manner represented in Fig. 1.

As more clearly indicated by Figs. 4, 5, 6, and 7, each of these two flux concentrator assemblages 32 and 34 is made up of a large number of individual laminations 36. These laminations are positioned side by side and all extend generally radially with respect to the assemblage center. In one construction found to be satisfactory the laminations 36 are cut from transformer iron stock of 0.014 inch thickness; obviously, however, the laminations also may be of either thinner or thicker stock and the material therefor may be any ferrous or other equivalent substance which is a good conductor of magnetic flux.

The laminations making up each assemblage half (32, 32', 34, 34') are, in the construction shown, held together by means of a weld bead designated as 37 in each of Figs. 1, 4, 5, 6 and 7. The weld metal constituting this bead 37 may satisfactorily be of stainless steel which results in a non-magnetic deposit that will not heat up as readily as will magnetic metal deposits as a result of flux going through it. Preferably, also, this bead of weld metal 37 is positioned on the side of the concentrator assemblage that is remote from the inductor coil C with which the concentrator is to be used as shown in Fig. 1. In this way, the weld bead 37 is subjected to a minimum of flux during operation of the apparatus.

Suitable hinge means 38 serve to join the upper concentrator half 32 with its cooperating lower concentrator half 32' and the upper concentrator half 34 with its cooperating lower concentrator half 34'. The hinge means here represented include a pin 38 which passes through members 39 and 40 that respectively are secured to the upper half and to the lower half of the concentrator assemblage. Preferably these two members 39 and 40 are extended beyond hinge pin 38 into a pair of handles (only partially shown here) by the aid of which the assemblage can readily be placed around the tubing A and B on the two sides of encircling heating conductor C as shown in Figs. 1, 4 and 5 or removed from around that tubing by opening up the two concentrator halves as represented by Fig. 7.

When the flux concentrators 32 and 34 encircle tube ends A and B as shown in Figs. 4 and 5 and are positioned closely adjacent the left and the right sides of the cooperating heating conductor C as shown in Fig. 1, it is preferable that direct electrical contact between the laminated assemblages and the central coil sides be avoided. Such avoidance may be accomplished by interposing thin layers of insulation 42 between each side of inductor coil C and the laminated concentrator 32 or 34 which is placed adjacent to that side.

This insulation 42 may take the form of mica or other heat resisting material and in the arrangement shown by Figs. 1 and 2 said insulating material 42 is wound as a tape around the body of inductor coil C at the four points indicated. Alternatively, the insulating material 42 can instead be carried on the inner face of each of the laminated concentrators 32 and 34.

The inner opening through these laminated concentrators 32 and 34 is made only slightly larger than the outside diameter of the tubing A and B which the concentrator is to encircle as shown in Figs. 1, 4 and 5. With these concentrator assemblages positioned as represented in Fig. 1 closely adjacent the left and right sides of inductor heating coil C, there are provided left and right side paths through which the magnetic flux set up by passage of high frequency current through conductor C is effectively transmitted to the metal in the aligned ends of tubes A and B. Such transmitted flux then returns to the inner portion 10 of coil C through the gap shown by Figs. 1 and 2 as separating the extreme end edges of said tubes A and B from the inner periphery of conductor C's inner portion 10.

In this way, the magnetic flux which serves to heat the ends of tubes A and B is effectively concentrated into the extreme edge portions of those ends with the desired narrowing of the heating band width. In consequence of such narrowing objectionable flaring of the tube metal will not occur when these heated ends of tubes A and B are pressed together after the temperature thereof has been raised to welding value.

*Operation of complete welding installation*

In utilizing the apparatus here disclosed for butt welding the ends of metal tubes A and B, these tubes are first aligned in their respective clamping blocks (not shown) in the general manner indicated by Fig. 1. In the open end of these tubes solid baffle 24 is placed prior to this alignment, and in the open end of the other of the tubes there is placed baffle 24' through the opening in which baffle there is brought the hose 26 that connects with the inert gas tank 28 as represented in Fig. 1.

Thus prepared, the two metal tubes A and B are secured in their supporting blocks (not shown) so as to leave between the tube ends an initial axial spacing somewhat less than the ¼ inch axial thickness of the encircling inductor coil C. The two halves C1 and C2 of this inductor coil are then centered around the tube ends A and B as shown in Figs. 1 and 2 and secured together at 12—13 to complete the current flow path from the secondary winding of transformer 15. The laminated concentrators 32 and 34 are thereupon placed around tubes A and B as shown in Figs. 4 and 5 and slid up against the sides of central encircling conductor C in the manner represented by Fig. 1.

Cooling fluid is then made available to the inner sections 10 of the inductor coil halves C1 and C2 and inert gas from source 23 is admitted through valve 29 into the space between baffles 24 and 24' for outward radial flow past the spaced ends of tubes A and B to be welded.

The high frequency oscillation generator G is now turned on at switch 18 causing transformer 15 to flow through the upper and lower coil halves C1 and C2 high frequency alternating current which is effective to heat the extreme end portions of tubes A and B to welding temperature. Such temperature may be of the order of 2300 to 2400 degrees F. and it is accompanied by a comparatively bright red glowing of the heated tube end metal.

In one operation cycle of tube end welding which has proven satisfactory, the tube ends A and B remain separated (by about ⅛ inch) as shown in Fig. 1 for between 20 and 30 seconds after the heating current is turned on at switch 18; and at the end of this heating-up period the tube ends A and B are pressed together to form the weld juncture indicated at 44 in Fig. 8. The supply of inert gas from tank 28 is continued for about 10 seconds more, at the end of which time valve 29 is closed to discontinue such supply.

The heating current applied by generator G to inductor coil C is then continued for approximately one and one-half minutes beyond the time that the tube ends A and B are pressed together. Immediately following such pressing, the laminated concentrators 32 and 34 as in Fig. 7 are removed from around tubes A and B leaving the apparatus in the condition shown by Fig. 8. With the laminated concentrators thus removed the optical pyrometer 20 is permitted to sight directly on the weld line 44 and continuously maintain the temperature of the tube metal at that line at the aforesaid temperature of between 2300 and 2400 degrees F.

This later period of heat application to the tube juncture is spoken of as "soaking," and it serves the useful purpose of allowing grain growth across the metal interfaces to take place. As earlier indicated, the duration of this "soaking" period may satisfactorily be of the order of 1½ minutes or more which, added to the approximately ½ minute heating-up period, brings the length of total heat application cycle to the order of about 2 minutes.

At the end of that total time, the heating current is cut off by opening power switch 18; the conductor coil halves C1 and C2 are separated at 12—13 and opened apart; and the two tubes A and B welded together at 44 are released from their clamp blocks (not shown) and withdrawn from the apparatus. The inert gas hose 26 is now pulled to the right out of the end of tube B carrying with it baffle 24', and the second baffle 24 is forced out of the interior of tube A as by compressed air or other suitable means. This completes the welding cycle.

Summary

In practice, highly successful results are obtainable from the novel tube end welding technique herein described when same is carried out by the aid of the unique apparatus therein disclosed. Boiler tubes of conventional ferrous composition having a diameter of three inches and a wall thickness of ¼ inch can in this way satisfactorily be joined without objectionable flaring of the tube end metal at the juncture 44 (Fig. 8); and it is found that boiler tubing of larger diameter having ¼ inch or greater wall thickness also can be welded in this way with equally satisfactory results. In fact, as the tube diameter and the wall thickness increase, the problem of making satisfactory butt welds seems progressively easier to solve.

The disclosed technique has likewise proven satisfactory on ferrous tubing of diameters down to two inches and of wall thicknesses down to 0.150 inch; the welding current employed having a frequency of 3000 cycles per second. With tubing of this relatively small two inch diameter and relatively small 0.150 inch wall thickness, it has been impossible heretofore to make satisfactory butt welds, and the invention as here disclosed therefore constitutes a definite forward step in the art. In fact when employing a 10,000 cycle per second heating current we have satisfactorily butt welded the ends of tubes having an outside diameter as small as one inch and a wall dimension as thin as 0.095 inch.

From the foregoing it will be seen that this invention makes it possible to keep the band of inductive heating applied to the tube ends sufficiently narrow so that objectionable flaring of the tube metal will not occur when these ends are pressed together after the temperature thereof has been raised to welding value; that it has provided an improved inductive heating conductor for concentrically encircling the extreme edge portions of the tube ends; that it has made available laminated flux concentrators capable of being positioned on either side of the encircling conductor at the start of the welding cycle when narrowing of the tube end heating band is imperative and of being removed from the encircling conductor later in the cycle when such narrowing is no longer necessary; and that the invention has provided improved means for bathing the tube end metal in a non-oxidizing gas which prevents air contamination of that metal at the high temperatures encountered during welding.

These inventive improvements are therefore extensive in their application and are not to be restricted to the specific form here disclosed by way of illustration.

What is claimed is:

1. In apparatus for butt welding the ends of metal tubes, the combination of means for holding said tube ends in aligned relation with an initial axial separating gap therebetween; an induction-heating conductor of relatively narrow axial width encircling the extreme edge portions of said aligned tube ends and adapted to create when energized a narrow field of high frequency alternating magnetic flux that imparts inductive heating to substantially only said edge portions; plug-like baffles inserted into the tube interior to block substantial escape of gas therethrough, one of said baffles being provided with an opening; a conduit communicating with said baffle opening and extending therefrom interiorly through the aforesaid metal tube which carries the baffle to and out of the remote end of that tube; a source of non-oxidizing gas external to said remote tube end; means connecting said conduit with said source whereby there is supplied through the conduit and said baffle opening a non-oxidizing gas which fills into the tube-end space between said baffles and flows radially out past the tube end edges through the aforesaid axial separating gap initially therebetween, said outflowing gas serving to bathe the tube end metal in a way preventing air contamination thereof while that metal is being heated to welding temperature by the aforesaid alternating magnetic flux from said induction-heating conductor; and means for pressing said thus heated tube-end edges together to effect contact and welding thereof.

2. For use in butt welding the ends of metal tubes that are adapted to be held in aligned relation with the tube ends initially separated by a small axial gap and later abutted together, an inductor-heating coil comprising a single turn of relatively flat conductor which is comparatively narrow in direction axially of the aforesaid tubes and which is adapted to encircle the extreme edge portions of the aligned tube ends and to create when energized a narrow field of high frequency alternating magnetic flux that imparts inductive heating to substantially only said edge portions, said single turn conductor being formed in two sections each of which is adapted to embrace substantially half of the periphery of said tube end edges whereby the two sections are cooperabe to provide substantially complete encirclement of those tube edges, means for establishing between the first ends of said two conductor sections an interconnection that is detachable and that permits those section ends to be opened apart by at least the diameter of the said metal tubes which the sections encircle, and means for connecting the second ends of said two conductor sections with an energizing source whereby when said first ends of those sections are interconnected there can be passed from said source through the two conductor sections a high frequency alternating current which imparts the aforesaid inductive heating to said encircled tube ends.

3. In apparatus for butt welding the ends of metal tubes, the combination of means for holding said tube ends in aligned relation with those ends initially separated by a small axial gap; an inductor-heating coil comprising a single turn of relatively flat conductor which is comparatively narrow in direction axially of said tubes and which is adapted to encircle the extreme edge portions of the aligned tube ends and to create when energized a narrow field of high frequency alternating magnetic flux that imparts inductive heating to substantially only said edge portions, said single turn conductor being made up of two sections each of which is adapted to embrace substantially half of the periphery of said tube end edges whereby the two sections are cooperable to provide substantially complete encirclement of those tube edges; means for establishing between the first ends of said two conductor sections an interconnection that is detachable and that permits those section ends to be opened apart by at least the diameter of the said metal tubes encircled as aforesaid; a source of high frequency alternating electric current including two output leads; means connecting said output leads with the second ends of said two conductor sections whereby there can be passed from said source through those conductor sections a high frequency alternating current which imparts the aforesaid inductive heating to the said aligned tube ends and thus brings the metal therein up to welding temperature; means for pressing said thus heated tube-end edges together to effect contact and welding thereof; and means forming along the inner face of each of said two conductor sections closest to the encircled tube ends a hollow portion which is adapted to have passed therethrough a cooling fluid that prevents heat from said heated tube ends from objectionably raising the temperature of the conductor sections.

4. In apparatus for butt welding the ends of metal tubes, the combination of means for holding said tube ends in aligned relation with those ends initially separated by a small axial gap; an inductor-heating coil comprising a single turn of relatively flat conductor which is comparatively narrow in direction axially of said tubes and which is adapted to encircle the extreme edge portions of the aligned tube ends and to create when energized a narrow field of high frequency alternating magnetic flux that imparts inductive heating to said edge portions; an assemblage of magnetic material laminations flanking each of the two sides of said flat and narrow heating conductor and serving to concentrate the aforesaid magnetic flux therefrom more narrowly into the extreme edge portion of the tube end which the assemblage surrounds, the laminations in each of said assemblages lying in planes generally radial to the axis of said surrounded tube with the inner lamination edges in close proximity to the outer surface of that tube and with one set of lamination side edges closely adjacent the flanked side of said inductor heating conductor; and means for pressing together the said tube-end edges to effect contact and welding thereof after those edges have been inductively heated as aforesaid.

5. In apparatus for butt welding the ends of metal tubes, the combination of means for holding said tube ends in aligned relation with those ends initially separated by a small axial gap; an inductor-heating coil comprising a single turn of relatively flat conductor which is comparatively narrow in direction axially of said tubes and which is adapted to encircle the extreme edge portions of the aligned tube ends and to create when energized a narrow field of high frequency alternating magnetic flux that imparts inductive heating to said edge portions, said single turn conductor being dimensioned so that its inner face is spaced by an appreciable radial distance from the periphery of the abutting tube ends encircled thereby; an assemblage of magnetic material laminations flanking each of the two sides of said flat and narrow heating conductor so as to concentrate the aforesaid magnetic flux therefrom into the extreme edge portion of the surrounded tube end, the laminations in each of said assemblages lying in planes generally radial to the tube axis with one set of lamination side edges close to the flanked side of said heating coil conductor and with the inner lamination edges close to the tube exterior so as to leave little or no radial spacing; and means for pressing together the said tube-end edges to effect contact and welding thereof after those edges have been inductively heated as aforesaid.

6. In apparatus for butt welding the ends of metal tubes, the combination of means for holding said tube ends in aligned relation with those ends initially separated by a small axial gap; an inductor-heating coil comprising a single turn of relatively flat conductor which is comparatively narrow in direction axially of said tubes and which is adapted to encircle the extreme edge portions of the aligned tube ends and to create when energized a narrow field of high frequency alternating magnetic flux that imparts inductive heating to said edge portions; an assemblage of magnetic material laminations flanking each of the two sides of said flat and narrow heating conductor so as to concentrate the aforesaid magnetic flux therefrom into the extreme edge portion of the surrounded tube end, the laminations in each of said assemblages lying in planes generally radial to the tube axis with the inner lamination edges close to the tube exterior and with one set of lamination side edges close to the flanked side of said heating coil conductor, each of said laminated assemblages being divided into two sections hinged together at one side and openable at the other so as to permit removal of the assemblage from the said tube which it surrounds and the said heating coil conductor which it flanks; means for pressing together the said tube-end edges to effect contact and welding thereof after those edges have been inductively heated as aforesaid; and means including extensions from said concentrator assemblage sections for removing those concentrator assemblages from their associated tubes and the heating coil conductor following said contact and welding of the heated tube ends.

7. For use in butt welding the ends of metal tubes that are adapted to be held in aligned relation with the tube ends abuttable for encirclement by an inductor heating conductor which when energized creates a narrow field of high frequency alternating magnetic flux that imparts inductive heating to the tube end edges, an assemblage of magnetic material laminations adapted to flank a side of said tube-encircling heating conductor for the purpose of concentrating the aforesaid magnetic flux therefrom into the extreme edge portion of the tube end which the assemblage surrounds, the laminations in said assemblage being positioned to lie in planes generally radial to the axis of said surrounded tube with the inner lamination edges closely approachable to the outer surface of that tube and with one set of lamination side edges closely approachable to the flanked side of said inductor heating conductor, and means including a bead of welding metal disposed around the assemblage for bonding the individual laminations therein into a unitary structure.

EDWARD CORBIN CHAPMAN.
ROY E. LORENTZ, JR.

References Cited in the file of this patent

UNITED STATES PATENTS

| Number | Name | Date |
|---|---|---|
| 1,893,926 | Anderson | Jan. 10, 1933 |
| 2,024,906 | Bennett | Dec. 17, 1935 |
| 2,179,176 | Dunn | Nov. 7, 1939 |
| 2,422,305 | Kopec | June 17, 1947 |
| 2,480,299 | Klinke | Aug. 30 1949 |
| 2,493,950 | Dow et al. | Jan. 10, 1950 |
| 2,496,188 | Wiese | Jan. 31 1950 |
| 2,542,393 | Chapman | Feb. 20, 1951 |